(12) United States Patent
Genera et al.

(10) Patent No.: US 9,081,860 B2
(45) Date of Patent: Jul. 14, 2015

(54) INTEGRATION OF DEVICE LOCATION INTO SEARCH

(75) Inventors: Phil Genera, Mountain View, CA (US); Joshua Siegel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 424 days.

(21) Appl. No.: 12/546,508

(22) Filed: Aug. 24, 2009

(65) Prior Publication Data

US 2015/0161149 A1    Jun. 11, 2015

Related U.S. Application Data

(60) Provisional application No. 61/091,204, filed on Aug. 22, 2008.

(51) Int. Cl.
*G06F 7/00* (2006.01)
*G06F 17/30* (2006.01)

(52) U.S. Cl.
CPC ...... *G06F 17/3087* (2013.01); *G06F 17/30867* (2013.01); *G06F 17/30241* (2013.01)

(58) Field of Classification Search
USPC .................. 707/709, 706, 724, 748
See application file for complete search history.

(56) References Cited

U.S. PATENT DOCUMENTS

| | | | |
|---|---|---|---|
| 6,442,479 B1 * | 8/2002 | Barton | 701/516 |
| 7,437,295 B2 | 10/2008 | Pitts, III et al. | |
| 7,778,837 B2 | 8/2010 | Thiesson et al. | |
| 2002/0022953 A1 * | 2/2002 | Bertolus et al. | 704/1 |
| 2004/0213409 A1 * | 10/2004 | Murto et al. | 380/258 |
| 2004/0267700 A1 * | 12/2004 | Dumais et al. | 707/2 |
| 2005/0108213 A1 * | 5/2005 | Riise et al. | 707/3 |
| 2006/0149700 A1 * | 7/2006 | Gladish et al. | 707/1 |
| 2006/0259861 A1 * | 11/2006 | Watson | 715/705 |
| 2007/0118430 A1 * | 5/2007 | Wiseman et al. | 705/26 |
| 2007/0136227 A1 | 6/2007 | Wegdam | |
| 2007/0214237 A1 * | 9/2007 | Stibel et al. | 709/217 |
| 2008/0090591 A1 * | 4/2008 | Miller et al. | 455/456.3 |
| 2008/0134030 A1 | 6/2008 | Kansal et al. | |
| 2008/0134088 A1 * | 6/2008 | Tse et al. | 715/810 |
| 2008/0194273 A1 * | 8/2008 | Kansal et al. | 455/456.3 |
| 2009/0106218 A1 * | 4/2009 | Srinivasan et al. | 707/4 |

* cited by examiner

*Primary Examiner* — Hosain Alam
*Assistant Examiner* — Eliyah S Harper
(74) *Attorney, Agent, or Firm* — Fish & Richardson P.C.

(57) ABSTRACT

A computer-implemented location determination method is disclosed. The method includes initiating, on computing device, a native application that provides data storage and data synchronization with a remote server; receiving a call to the native application from an application running within a browser on the device; and providing information indicating a location of the device in response to the call.

20 Claims, 8 Drawing Sheets

INTEGRATION OF DEVICE LOCATION INTO SEARCH

CROSS-REFERENCE TO RELATED APPLICATIONS

This application claims priority to U.S. Application Ser. No. 61/091,204, filed on Aug. 22, 2008, and entitled, "Integration of Device Location Into Search".

TECHNICAL FIELD

This document relates to integrating a user's location with search requests made by the user, or other user location information.

BACKGROUND

People continue to demand more from their computing devices. With such devices shrinking and being incorporated into mobile devices such as smart phones, there is more that can be done for these people. For example, people may use mobile devices to conduct searches across particular geographic areas (such as the areas immediately around the person as the person travels from one town to another), which is known generally as local search. Because a mobile device generally belongs only to a particular person, that person may also want the device personalized to their preferences more than they would for a desktop or similar computer.

SUMMARY

This document describes systems and techniques that may be used to provide local search results within a browser application on a mobile device, or to otherwise use device location in a browser-based application. The actual or inferred location of a device may be determined. Actual location determination may occur, for example, using GPS capabilities on the device or by identifying cellular tower locations through which the device communicates with a central network. Access to such actual location information may be provided to various in-browser applications using a separate native application that provides an API for obtaining location information from the GPS unit on a device. Location may alternatively be inferred from a query provided by the user, such as in an explicit location term such as a city name in a query. Techniques like those described herein may be seen in products such as GOOGLE GEARS and the HTML 5 specification.

In certain embodiments, the features discussed here may provide one or more advantages. For example, a user can submit queries along with an indicator of a location in which they would like a search to be centered. When the user does not enter such a location, their device can obtain location information, including via browser-based applications, such as applications run from JavaScript on a web page. In this manner, a user can be provided the option of dictating a location, on may automatically be provided with a location when they do not specify a location. Also, by brokering access to GPS data on a device through a native application, a user can install such a native application once from a trusted source, and may then depend on the native application to control access to location information for other typical in-browser applications.

In one implementation, a computer-implemented location determination method is disclosed. The method comprises initiating, on computing device, a native application that provides data storage and data synchronization with a remote server; receiving a call to the native application from an application running within a browser on the device; and providing information indicating a location of the device in response to the call. The method can also include appending the information indicating a location to a search query broadcast by the device to a remote search engine server. Providing information indicating a location of the device can comprise determining whether information for a current location is available, and if it is not available, providing information from a stored recent location associated with the device. Also, providing information indicating a location of the device can comprise providing information of a stored location from a prior query if a recent location is not available.

In some aspects, the method further comprises transmitting the information indicating a location of the device to a remote server system. The method can also include receiving, from the remote server system, a human-readable description of a device location and displaying the description to a user of the device. In addition, the method can comprise receiving a query from the user, appending a description of the device location to the query, and transmitting the query and appended device location to a remote search engine. Providing information indicating a location of the device can comprise obtaining a location identifier from a module on the device, submitting the location identifier to a remote server, and providing a location descriptor received from the remote server system to the application running within the browser. In addition, providing information indicating a location of the device can comprise determining whether a location descriptor is included in a query submitted to the device, and, if so, providing information indicating a location of the location descriptor over an actual location of the device.

In another implementation, a computer-implemented location determination system is disclosed. The system includes a browser application to execute code from web pages loaded by a computing device, a location determination module to determine a geographic location of the computing device, and a native application on the computing device, separate from the browser application, to receive a call for obtaining a location identifier from the location determination module. The native application can be programmed to submit the location identifier to a remote server and to provide a location descriptor received from the remote server to web page code operating in the browser. Also, the native application can be programmed to provide the location identifier to web page code operating in the browser and the web page code is programmed to submit the location identifier to a remote server and display a location description received in response to submission of the location identifier.

In some aspects, the location determination module comprises a commercially-available global positioning system (GPS) receiver module. In addition, the code from web pages can comprise JavaScript code.

In yet another implementation, a computer-implemented location determination method is disclosed. The method comprises receiving, from an application on a remote computing device, a search request, determining if an explicit location description is included in the search request, and if it is, performing a local search for a location of the location description using the search request, executing a local search request using an actual location of the device submitted with the search request if an explicit location description is not included in the search request, and executing a local search request using a stored location corresponding to an earlier search request form the device, if an actual location of the device is not available. The method can also include transmitting to the remote computing device, search results targeted to a determined location. In addition, the stored location can be stored on the remote computing device.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for identifying a location for a computing device such as a mobile device in the form of a smart phone. The document also describes the use of location information to provide data to the device, such as by supplying a location to be used with search queries submitted by a user of the device, so as to produce local search results to be returned to and displayed on the device. The location may be obtained from various sources, depending on whether the particular sources are available. For example, a GPS module on the device may provide an actual, current location of the device. Although browsers generally block web-page based applications from accessing such information, a native application may provide an API by which a web-based application may make a simple request and may receive location information for the device in response.

The device may also save location information (e.g., names of cities) for prior searches. Such saved information may be used in at least two manners. First, where a better indicator of device location cannot be obtained, location information from a prior query, such as the last most recent query, can be used and submitted with a new query. Also, a list of prior locations may be provided to a user, either before they submit a query or after search results for a first location are delivered, so that the user may select one of the locations and the search may be re-run on the selected location.

Figure 1:
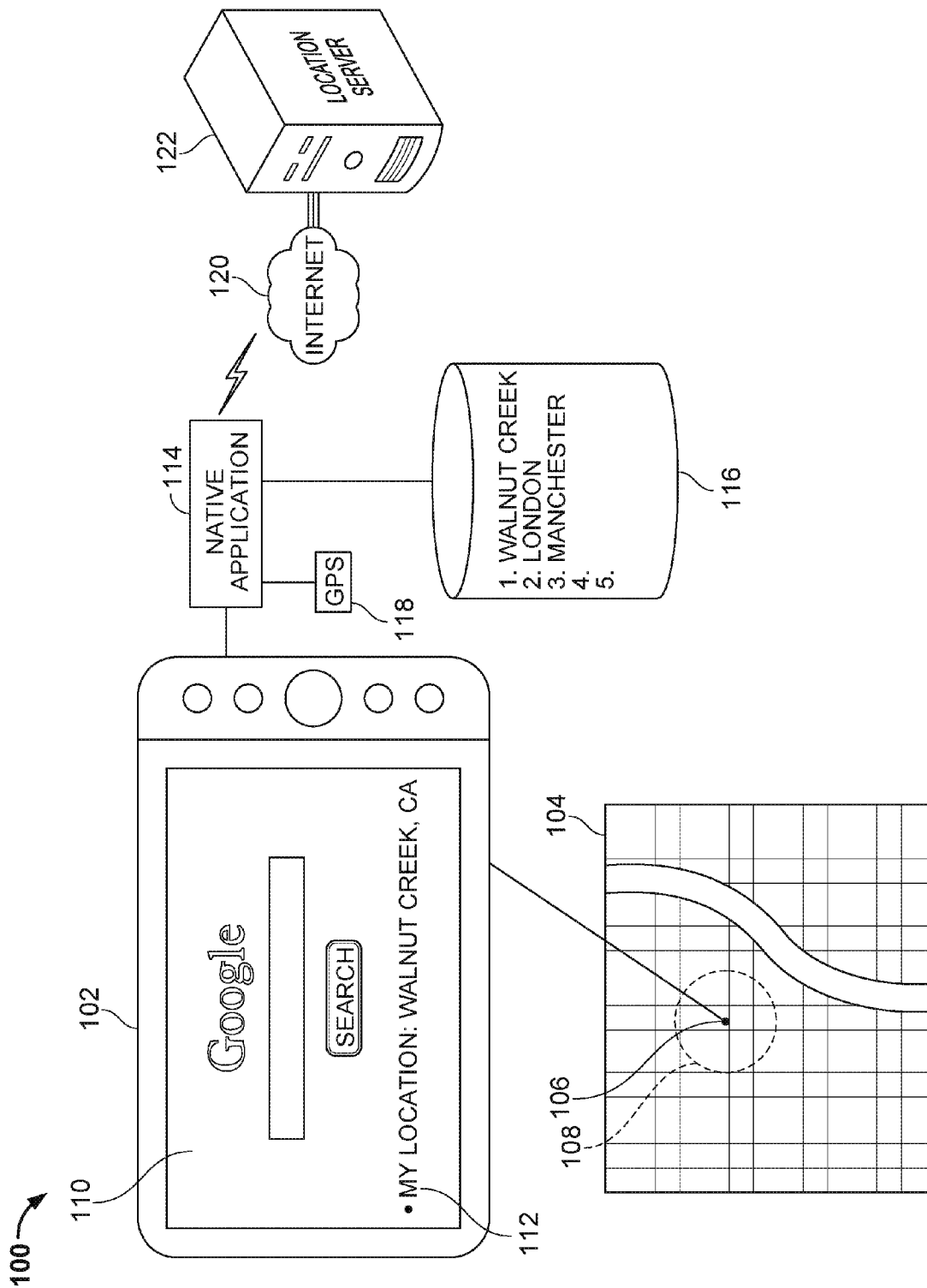
FIG. 1 is a conceptual diagram of a system for identifying a location to be used with an internet search query.

FIG. 1 is a conceptual diagram of a system 100 for identifying a location to be used with an internet search query. In general, the system 100 provides various mechanisms by which a user's location, in the form of the location of a mobile computing device 102, may be integrated into search queries and search results. In particular, in certain implementations, the system 100 may add a location to a search query using the best possible source for location information, and instead use other, lower-quality sources of location information if better sources are not available. The location information may be used as a location-limiting parameter for a local search that may be performed on the device 102 and/or a remote server system 122.

Referring to the figure, the mobile device 102 is shown displaying a search page 110. The mobile device 192 may take a number of forms, such as a laptop computer or a smart phone. Search page 110 may be a webpage for a commercial online search system, and may be displayed as part of an internet Web browser. Techniques discussed here may be used to provide location information for use within an application running on the browser, such as a JavaScript application that is loaded with the search page 110.

A map 104 shows, conceptually, a current location of the mobile device 102. In a first example, an exact location 106 of the mobile device 102 may be provided by techniques such as global positioning system (GPS) modules that are incorporated into the mobile device 102. A more general, or uncertain, location for the device is shown by the dashed circle 108, which may represent an approximate location determined using a cell tower cell identifiers, and server-based maps representing the location of cell towers and their respective cells. An example of such a location method is GOOGLE's MY LOCATION service. Also, similar techniques may be used to determine a user's location when the user is transmitting over a WiFi or similar type of network access point. Alternatively, or in addition, a user's IP address may be used in certain situations to estimate a location for the user.

A user may wish to have a search that they submit be accompanied by a location indicator corresponding to location 106 or the location of circle 108. For example, if the user searches on a particular type of food, they may want to be provided with a list of restaurants in the area around them that serves such food. To provide such location-specific results, the system 100 needs to first determine an actual or estimated location for the mobile device 102. However, the browser application that presents a search page 110 may be unable, because of security restrictions or lack of functionality, to communicate directly with modules that provide location information, such as GPS module 118. As a result, an actual location for the device 102 may not be available for a user of the device 102 who is using a web browser and a browser-based application.

A native application 114 that resides on the device 102, meaning that the application 114 has been installed with the operating system of the device 102, and is not simply an application running inside a Web browser, is shown here to provide access to device features such as those provided by GPS module 118 to applications running within the web browser. The native application 114 may take a form similar to that provided by the well-known GEARS software originally released by GOOGLE and now in open-source distribution. In particular, the native application may establish a number of application programming interfaces (API's) by which applications running within a web browser, such as JavaScript applications, may access additional device resources.

In one example, the native application 114 may provide a database 116 that stores data for access by web-based applications. The native application 114 may also provide modules (not shown) for providing parallel execution of web-based code (to manage code execution and prevent code executing on the device 102 from interfering with the device's operation), for caching and serving application resources such as HTML, JavaScript, images, and other resources, and for permitting Web applications to interact with a desktop on device 102. In addition, the native application 114 may provide a component (not shown) for synchronizing information in the database 116 with a remote server system, such as server system 122, so that users may continue to interact with web-based applications on device 102 even when device 102 does not have a live internet connection.

As can be seen in the figure, database 116 includes, among many other things, a list of recent locations for the device 102. The recent locations may have been generated based on searches conducted on search page 110 in recent days by a user. Such information in database 116 may have been gathered at the time of the submission of a search by GPS module 118, by a service such as MY LOCATION, or by identifying location related terms in a query, such as the names of cities, airport codes, or ZIP codes.

The list of locations in database 116 may be used in a variety of manners. For example, when a user submits a search query, and device 102 is not able to obtain a current actual location from GPS unit 118, the top location in the list may be submitted with the query, such as by appending that location to the query when submitting a query to a remote server system. Alternatively, each of the locations in the list may be submitted with a query, and may be given progressively less weight in identifying search results for the user's search query. The system may also perform separate searches for each location in the list, so that the user may switch quickly between the search results without experience a delay in the switching.

In addition, after a search result is returned to a user, a drop-down menu may be provided to the user that lists each of the locations in the list, so that the user may select a different location than the location initially submitted with the query. For example, a user may previously have entered search queries identifying their hometown, may presently be located in an area away from their hometown, but may be returning to their hometown soon and may be interested in restaurants for their hometown. In such a situation, a search for a term such as "sushi" may initially be submitted with a location identifier from GPS module 118, so that restaurants in the user's current vicinity, but not the user's hometown, are shown. By using a drop-down menu that displays the latest locations from database 116, the user may quickly select the name of their hometown and have search results provided for that location, without having to separately type in the name of their hometown.

The server system 122, which may be in the form of one or more location servers for resolving location-related inquiries and for provided local search results, communicates with the mobile device 102 via a network such as the internet 120. The server system 122 may be part of a larger system that is provided by a service provider, such as a service provider that operates an internet-accessible search engine. As described in more detail below, the server system 122 may accept queries and related data from devices such as mobile device 102, and may translate such information to determine a location that may be used in performing a local search for providing search results to the device 102.

Such an identification of location by server system 122 may take the form of a process involving selection of location by levels of decreasing preference. For example, the server system 122 may use an actual location provided with a query that is received from native application 114 if such an actual location, such as a GPS [derived location, is available. If such a location is not available, the native application 114, in cooperation with the server system 122, may use a location of a last search made on device 102. Alternatively, or if a last search location is not available to server system 122, the server system 122 may attempt to discern a approximate location for device 102, such as by using locational information for a cell tower or cell towers through which device 102 is transmitting. The server system 122 may also parse a query to determine whether a user has included an explicit location in the query, such as the name of the city, an airport code, or a zip code.

As one example showing the use of system 100, a user may initially launch a Web browser and be taken to a search page for an online search engine, such as that provided by GOOGLE. The page may initially indicate, with indicator 112, that it does not know the user's location. Such an indication may signal to the user that they need to provide explicit location information for a search if they want the search to be treated as a local search. The user may then a query of "sushi London," which may cause server system 122 to trigger a search for sushi restaurants in the London area (since the server system 122 will recognize "London" as a location-related term). In addition, "London" may be written to database 116, or to another location such as to a cookie stored on device 102.

If a user later enters the query "pizza" into device 102, and no explicit location is available, such as if device 102 has had its GPS capabilities disabled, the device 102 may append to the query the term "London,": because that term will be the top term in database list 116. The server system 122 may then trigger a local search for London and pizza, so as to return search results of pizzerias in London.

If the user then enters the search query "kittens," local search will not trigger for the search. Such a result may come about by the device 102 appending to the query with the term "London," but the server system 122 may then determine that the query of "kitten" is not a location-based query, and will thereby not perform a local search on the term. Such a determination by server system 122 may be performed, for example, by comparing terms in a search query to a white list or blacklist of mobile or non-mobile search terms.

In this example use case, the user may later search for "pizza Manchester," which may cause "Manchaester" to be added to the top of the list in database 116 (and London to be moved down), and the server system 122 may return local results for pizza restaurants in the Manchester area. (The system 100 may determine that Manchester U.K. is intended rather than a Manchester, N.H, by using IP address information or other such information to determine a region for the search.) If the user then searches for "sushi," the search may be a local search for sushi restaurants in the Manchester area, rather than the London area, because Manchester has since supplanted London as the primary location in the database 116 list. If the user intended for the search to be based in London, as with their prior search, they can select a drop-down menu that is populated with the locations from the database 116, and select London from that menu in order to have the sushi search re-run for London. (In other implementations, the search may have been run for all locations, so that selection of London from the drop-down menu may simply cause the display of the already-retrieved results for London).

In this manner, the system 100 may determine a best location to associate with queries received from a device 102 so as to provide more relevant search results to a user of device 102. The determination of location may be made without the need for explicit location identifications by the user, but the user may override other location information, such as by including an explicit location in a search query. As a result, a user may receive location-related results without having to seek such results, but may also conveniently override a location for a local search request.

Location identifiers in various implementations may be descriptive or may take other forms, and may be converted from one form to another as necessary. A descriptive identifier is one that can be readily perceived by a user of a device, such as in the form of a city or street name. Other location identifiers mat take the form of lat/long coordinates or other similar machine-processable forms. Conversion may occur so as to make a location identifier usable by a computer or a user of a computer. For example, lat/long coordinates may be obtained by a mobile device and transmitted to a central server. The server may then reverse geocode the coordinates to generate a string that includes information such as a zip code or city name. The particular techniques used to geocode or reverse geocode are not critical here.

Figure 2:
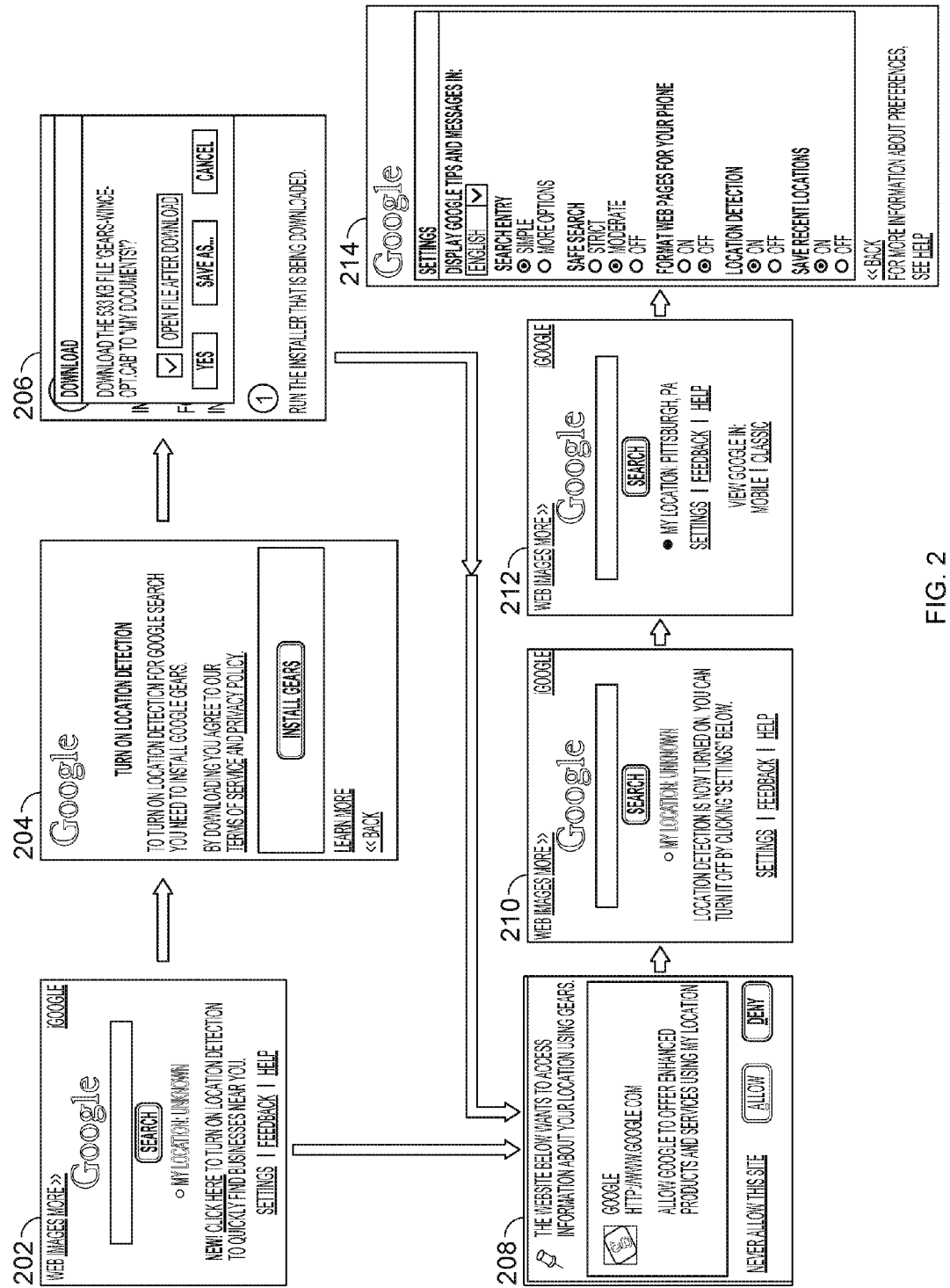
FIG. 2 is a visual flow diagram of displays that may be presented to a user of a computing device who is adding location tracking abilities to their device.

FIG. 2 is a visual flow diagram of displays 202-214 that may be presented to a user of a computing device who is adding location tracking abilities to their device. In general, the displays 202-214 show steps a user may take to download a native application for providing location information to browser-based applications (such as a search page) The user may then be allowed to configure the behavior of such a native application with respect to its location-providing functionality.

Display 202 shows an initial search page that may be presented to a user of a computing device, such as a smart phone or other mobile device. In this example, the user has not yet set up their device as being location aware, so the user is presented with indicators that their location is not known by the system, and items promoting that they may add location determining capabilities to their device. Such items may be shown to the user in a promotional manner for their first several page views of the search page, and may be removed for subsequent viewing of the page, under the assumption that the user, by failing to react to the items, chose not to select such functionality and would prefer not to be reminded of it repeatedly.

Display 204 shows what happens if the user selects the "click here" link from display 202. Display 204 provides the user with information about a native application that they may download to their device and install on their device to provide location awareness for the device. In this example, the native application is the GEARS application provided by GOOGLE. The user may also be provided with other options such as an opportunity to review a privacy policy and terms of service that govern the operation of the native application.

Display 206 shows what happens when a user selects the install button from display 204. In particular, a standard download dialog box is displayed to the user. The dialog box may permit the user to save and launch an install program, or simply to launch an install program, in a familiar manner. The particular manner of downloading and installing the native application is not critical here.

Display 208 is shown after the user installs the native application from display 206, or otherwise during the first time a particular Internet application is accessed after the native application is installed. In this example, display 208 shows a warning that is provided to a user of a device indicating that a domain would like to access information about the user's location, and giving the user an opportunity to permit such access, to deny such access, or to deny such access forever. In this manner, the user may have an opportunity to review the URL identifying a service to determine whether that service is trustworthy, so that the user may grant access to their location information only to services that they trust.

Where the native application provides basic location access for browser-based code, the user may conveniently grant access only to the native application, which may in turn limit the level of access provided to the browser-based code. As a result, the user need only trust the provider of the native application, and need not perform homework on all of the providers of code running on web pages that the user may download later.

Display 210 shows the result of a user granting access to the GOOGLE search page application. In the display 210, it is shown that the device is acquiring a location to associate with the user or device. In addition, text is provided indicating that location detection has been turned on and indicating how the user can turn it off if they would like to increase the level of their privacy. The native application may likewise provide for a user notification any time location features are active. For example, a reminder box may pop up every time the functionality is activated, and an icon or other visual notification may be displayed at the top or bottom of a display.

Display 212 indicates what a user will see once their location has been determined. Such a determination may be made by a number of mechanisms. For example, where a device includes a GPS module, the native application may obtain a location identifier in an encoded form from the GPS module (e.g., as a lat/long pair), may submit the location identifier to a remote location server, and may receive back from the remote location server a location name, which in this example is Pittsburgh, Pa. A native application may then pass the location name to the webpage application, where it is displayed as a MY LOCATION location. Alternatively, a MY LOCATION indication in the display may be reserved only for a location determination that uses cell tower IDs to compare a user's location to known locations for cell towers, such as the GOOGLE MY LOCATION service. In such a situation, the "My location" preamble may indicate to a user that their location was derived using that service. Alternative preambles may indicate that a user's location was derived from a GPS module, or from terms included in a parior query submitted by a user.

If the user viewing display 212 selects the settings hyperlink, they may be good presented with display 214. Display 214 allows the user to set parameters for the manner in which their location awareness features operate. For example, the user may indicate the language that they would like the location awareness features to be presented in, the form in which they would like to enter their search terms, whether they would like their search results to be moderated for adult and other potentially offensive content, whether they would like web pages to be formatted for the particular type of mobile device they are using, whether they would like location detection enabled on the device such as a form of GPS detection or cell tower detection, and whether they would like the device to save their recent locations.

For the last option, the recent locations may come from a number of sources, as discussed above. For example, if a user conducts a search and the user's actual location is determined by GPS functionality or cell tower functionality, such a location may be saved, including by gathering a location name for the location and saving that location name in a cookie or other file on the user's device. Also, an inferred location for the device may be gathered from search queries, such as when a user includes the name of a city in a search query.

Figure 3:
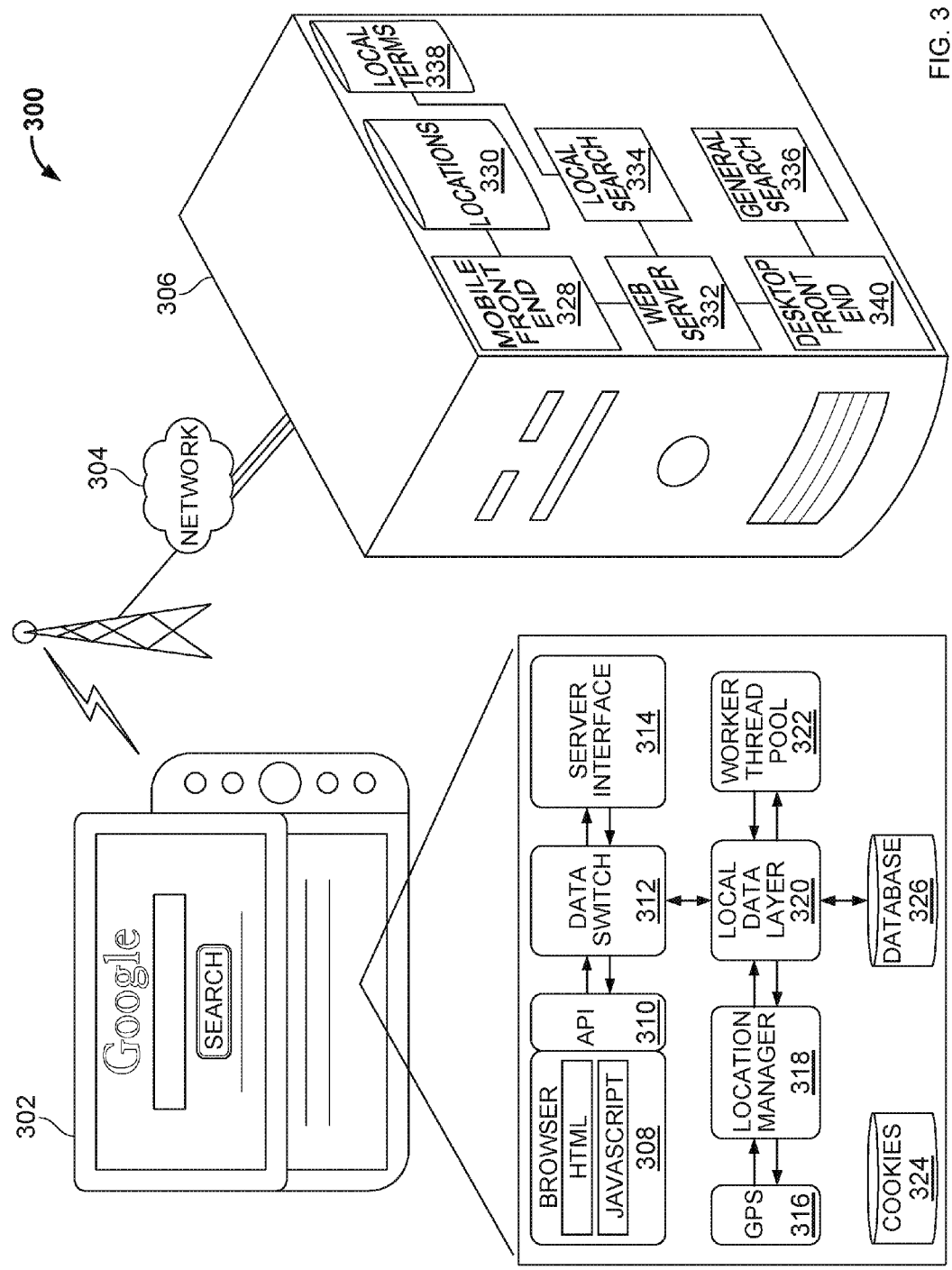
FIG. 3 is a block diagram of a system for providing location information for use by a mobile computing device.

FIG. 3 is a block diagram of a system 300 for providing location information for use by a mobile computing device 302. The system 300 may be similar to system 100 shown in FIG. 1, though additional details are shown here of structural components in the system 300. In general, the system 300 and is configured to provide, to a user or device 302, an indication of their location using various different levels of precision, and depending on which type of location identifier is available to the system 300. Such an indication of location may then be used by the system 300 in various manners, such as a location trigger for a local search query.

The system 300 generally includes one or more mobile devices such as device 302, communicating over a network 304, such as the internet, and/or a cellular telephone or data network, with a server system 306. The device 302 is provided with a number of components by which to interact with a user of the device 302 and to provide services such as location-aware search results in response to queries entered by the user. One such component is a standard internet Web browser 308 which may take a variety of forms, and may execute webpage code such as in the form of HTML code and JavaScript code. For instance, the device 302 may be directed to a particular URL, and the code at that URL may be downloaded onto device 302 in order to present a display of a webpage to a user of device 302.

The browser 308 may interact directly with remote server systems, or code operating on the browser 308 may act through an application programming interface (API) 310. The API 310 may take a variety of forms and may translate requests from code operating on the browser 308 into forms that can be used outside of the browser on the device 302. Such requests may be handled by data switch 312, which may determine whether a request from code running on the browser 308 requires access to information on the device 302 or also requires access to information on a remote server. If access to a remote server is required, the data switch 312 may communicate through a server interface 314 which may package a request in forms such as an HTTP request and may receive responses through network 304 from server systems such as server system 306.

If the information requested by code running on browser 308 can be obtained locally, the data switch 312 accesses such data using a local data layer 320. The local data layer 320 and the other components shown here may take the form of native applications such as the GEARS application originally provided by GOOGLE. Such an application may provide functionality for webpages even when device 302 is not in contact with network 304. To do so, local data layer 320 may access a database 326, which may be responsible for storing information needed by programs or applications running on browser 308. In addition, a worker thread pool 322 may be used to manage actions being operated upon on device 302, so that no action can take over the processor of device 302 and thereby cause unnecessary delay in the operation of other actions.

The local data layer 320 may also provide access to actual location data for device 302. Such data may be generated initially by a global positioning system (GPS) module 316, which may take a variety of familiar forms. A location manager 318 may communicate with the GPS module 316 and provide data about the location of the device 302 to the local data layer 320 when an application requests such information from the local data later 320. Alternatively, or in addition to database 326, the device 302 may include various cookies 324 for storing location information or other information for a user of device 302. For example, database 326 or cookies 324 may store descriptions of prior locations on which a user has searched with device 302. Using such storage, device 302 may present to the user a list of recent locations, so that the user may quickly select and identify a location that they would like to use in their searching of various terms.

Thus, for example, in the operation of the system 300, a search page may initially be loaded by the browser 308 and may include JavaScript code that requests a location of the device 302. The code may submit a predefined function to the API 310 and may receive a location of the device 302 in response. For example, the local data layer 320 may interpret the request and may obtain location data from the location manager 318. Such location data may not be in a readable form, so local data layer 320 may request a reverse lookup of the information via network 304 and server 306. The server 306 may then return a name for the location, such as a name of a city or other similar geographic area. Such information may be routed back to the JavaScript code on the browser 308 and may be displayed to the user of the device, to indicate the location at which the device 302 believes the user is located. If GPS data is not available, the local data layer 320 may then request location data from the database 326 or cookies 324. For example, the local data layer 320 may select a highest location listed in the database 326 (e.g., a location that is associated with the most recent search on the device 302 that related to a location). Alternatively, the local data layer 320 may submit a request through network 304 to server 306, and server 306 may identify cell towers in the vicinity of device 302, and may in turn identify an approximate location of device 302 using known methods such as GOOGLE's MY LOCATION service.

When a user conducts a local search, the local data layer 320 may likewise write a location associated with that search to the database 326, so that recent locations associated with searches are maintained and updated in the database 326, and made available for use on the device 302.

The server 306 itself includes a number of components in providing location-related information such as local search results to the device 302. For example, a mobile front end 328 may be used to format information for use by mobile devices such as smart phones. The server 306 may also include a desktop front end 340 that is used to format information for full-featured browsers. The determination of which front-end to use may be based upon a URL that the device 302 used in initially accessing a page served by the server 306 (which may be a single server or a system that includes a large number of server that are each dedicated to a particular function or functions).

A Web server 332 may receive requests routed through the front ends 328, 340, and may provide information back to the front ends 328, 340. Such information may be provided in a number of manners, such as by a common XML scheme so that the Web server 332 may return the same information to the mobile front end 328 as it returns to the desktop front end 340. Each front end 328, 340 may then format the XML information or similar information in an appropriate manner, and transmitted back to the device 302.

The mobile front end 328 may also, in certain implementations, reference a database of locations 330. Such location information may be associated with particular users such as by using session IDs, and may be similar to location data stored in cookies 324 or database 326. For example, the locations database 330 may store a list of a last five locations associated with search for a particular user (via a session ID), so that those locations may be used in developing local search results when a submitted query does not include an explicit location identifier such as GPS data.

The Web server 332 may interpret requests from the front ends 328, 340, and may obtain appropriate search results for such requests. For example, Web server 332 may operate with a local search engine 334 to determine whether a particular search query is a local search. As one example, a local search may be identified where particular location information is included with a query, such as a latitude and longitude or other locational identifier. Also, certain terms in a search query may trigger a determination that the query is a local search, such as the names of towns or airport identifiers, or particular words that are known by prior analysis to be local in character. Such words may include types of food, descriptions for bricks-and-mortar businesses (e.g., "grocery" or "dry cleaner"), words relating to movies, and other similar words by which people have been determined to search for information in their area. A local terms database 338 may be accessed by local search engine 334 so that terms within a query may be compared to a white list or black list of local or nonlocal terms, as the case may be.

If one or more terms in a query correspond to terms within the local terms database 338, a local search engine 334 and Web server 332 may determine that the search is local in character, and may return local search results for the search, using a location identified for the search. If the query is determined not to be local, such as in the example of the query "kitten" above, the general search engine 336 may return results. Although shown separately, local search engine 334 and general search engine 336 may be part of, or may be, the same search engine, where the general search functionality is triggered where a query does not include any local search terms.

Figure 4A:
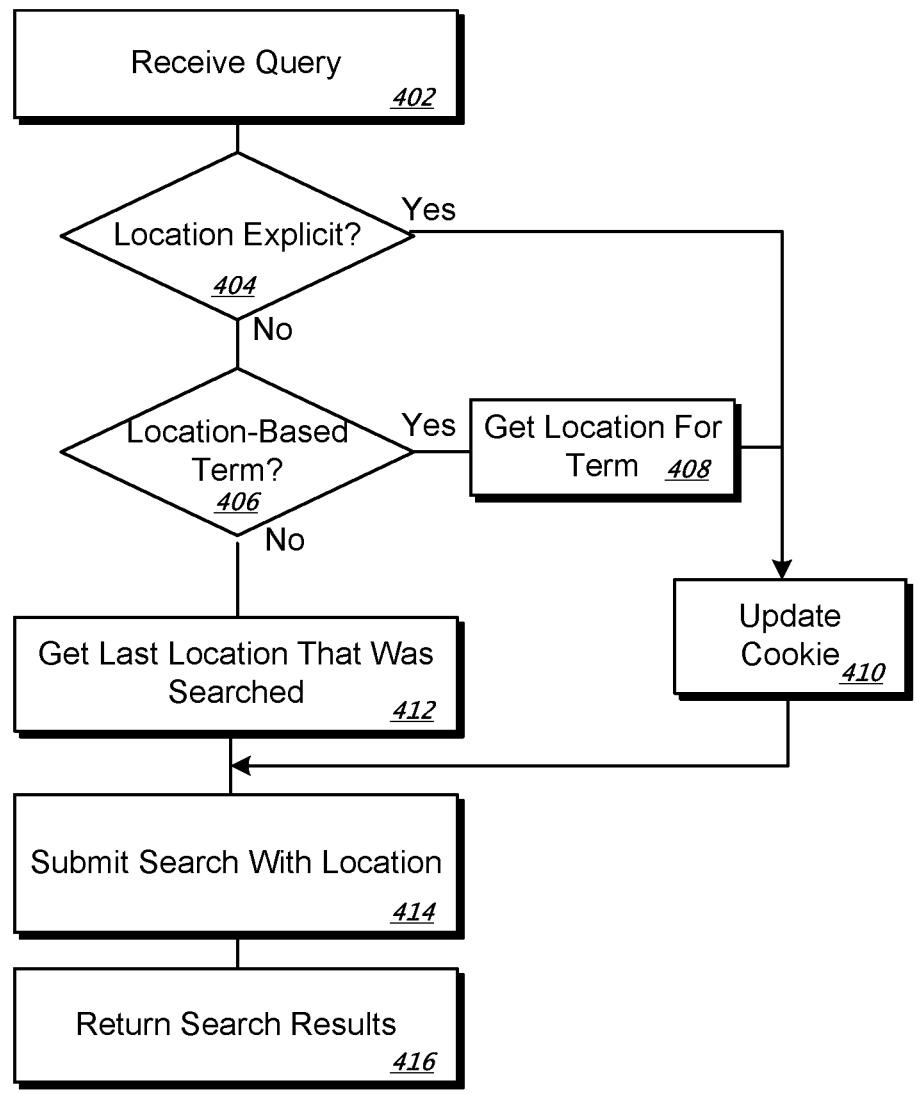
FIG. 4A is a flowchart of a process for determining a location using multiple possible location determining tools.

FIG. 4A is a flowchart of a process for determining a location using multiple possible location determining tools. In general, the process involves stepping through a group of available tools, from a most-favored tool to a least-favored tool, in attempting to determine an explicit or implied location to associate with a search request.

At box 402, a query, or search request, is initially received. A process then checks, at box 404, to determine whether an explicit location has been included as part of the query. For example, a latitude and longitude pair may be included in the query itself, or in metadata submitted with the query, in a familiar matter. If the location is explicit in the query, the process may update a cookie 410 associated with the device on which the query was received.

If the location is not explicit, the process may move to a second tool for determining location, which is to test for whether a location-based term appears in the query, at box 406. For example, the process may look for city names of large cities, or city names combined with two-letter state abbreviations for smaller cities, or to three-letter airport abbreviations. If such a term is included in the query, a location for the term may be obtained, such as by supplying the term to a look up table that returns a more standard form of a location descriptor, such as by changing "Battery Park" to "New York City."

If no such term is used in the query, but the query may be a local search, a last location searched may be obtained. For example, the process may test against a whitelist of local terms like "pizza," "restaurant," "park," and other similar terms, to determine that the query is local. The process may then obtain a location to use with the query, such as a last location associated with a search for a user, and may conduct a local search on the combination of the query and the obtained location. Obtaining the last location may occur by a client device submitting the location with the query, by a server looking at a cache of stored locations for a user (e.g., that are associated with a session ID), or by other similar mechanisms.

The process may then submit the search with the location 414, where the query has been determined to be related to a local search. The local search engine may return responsive local search results, which may then be displayed to a user of a computing device in a normal manner.

Figure 4B:
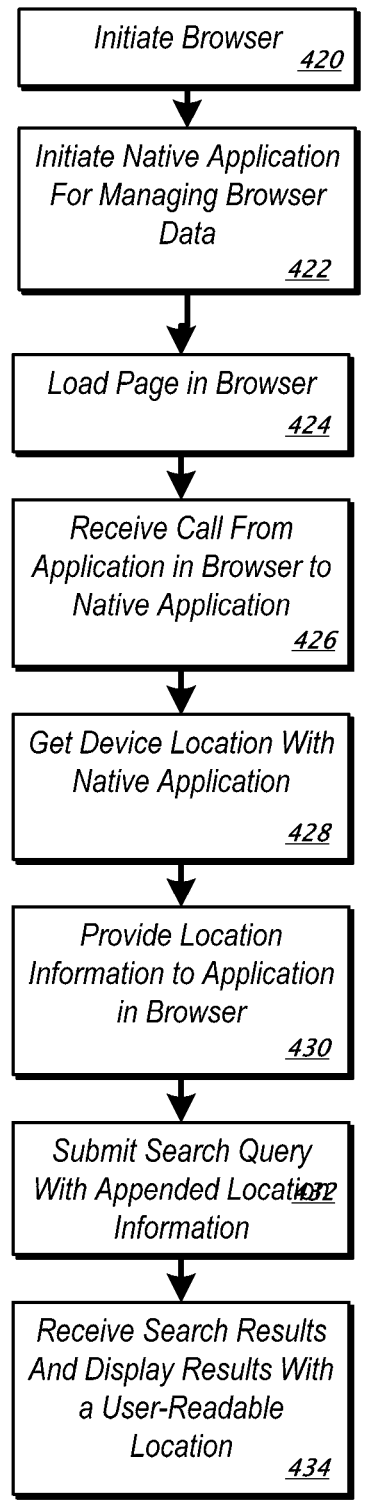
FIG. 4B is a flowchart of a process by which a native application identifies location information for a browser-based application.

FIG. 4B is a flowchart of a process by which a native application identifies location information for a browser-based application. In general, the process shows a mechanism by which a web-based application (i.e., an application running within a browser, such as based on code from a web page loaded by the browser) can access location information for a device on which the web-based application is running.

At box 420, a browser is initiated, such as by a user selecting an icon for the browser or for a particular application, such as a search engine application, to be run in the browser. A native application that cooperates with the browser, for managing browser data, may then be initiated (box 422). The native application may take a form such as the GEARS application.

Initiation of the browser may also cause a web page to be render automatically, such as the main search page for a search engine (box 424). The code for that page may include JavaScript code for determining and presenting a current location of the device on which the code is running. However, the browser itself may not provide a mechanism by which to access that information. As a result, an API may permit for requests from any browser-based application to the native application in order to retrieve particular location-based information about the device. For example, access to location information computed either from a device's GPS functionality, from WiFi-to-location databases, from IP address analysis, or from Cell-ID analysis, may be made available via a single JavaScript method that is available to in-browser application, such as in the form of getCurrentPosition( ).

In one example using the GEARS application, a browser-based application may define a geolocation interface that provides a response that contains a last known position of the device, a current location of the device, or a current position of the device updated over time using the following definitions (and stopping the monitoring of location), respectively:

interface Geolocation {
    readonly Position lastPosition;
        void getCurrentPosition(function successCallback, optional function errorCallback, optional PositionOptions options);
        int watchPosition(function successCallback, optional function errorCallback, optional PositionOptions options);
    void clearWatch(int watch Id);
    };
Particular position parameters may be identified and called for using the following requests:
    interface Position {
    readonly double latitude; // latitude in degrees (WGS84 datum)
      readonly double longitude; // longitude in degrees (WGS84 datum)
        readonly int altitude; // height in meters (WGS84 datum), or null if
    unsupported by device.
    readonly int accuracy; // in meters
      readonly int altitudeAccuracy; // in meters, or null if unsupported
      readonly Date timestamp; // time when location was established
        readonly Address gearsAddress; // reverse geocoded address, if requested and available. Gears extension
};
Particular usable address information in a human-readable form may be retrieved with the following requests:

```
interface Address {
    readonly string streetNumber; // street number
    readonly string street; // street address
    readonly string premises; // premises, e.g. building name
    readonly string city; // city name
    readonly string county; // county name
    readonly string region; // region, e.g. a state in the US
    readonly string country; // country
    readonly string countryCode; // country code (ISO 3166-1)
    readonly string postalCode; // postal code
}
```

A web-based application may also indicate that it would like to receive the best possible results using the request:

```
interface PositionOptions {
    bool enableHighAccuracy;
}
```

One example implementation to obtain position information for a web-based application is as follows:

```
var geo=google.gears.factory.create('beta.geolocation');
// Get the position.
geo.getCurrentPosition(function(position) {
    updateMap(position.latitude, position.longitude);
});
// Watch the position over time.
    var watch Id=geo.watchPosition(function(position) {
updateMap(position.latitude, position.longitude, position-
    .accuracy);
});
    geo.clearWatch(watchId);
// Only get the position if the last known position is more
    than a minute old.
    var now=new Date( )getTime( )
var threshold=now−60000;
    if (geo.lastPosition &&
geo.lastPosition.timestamp.getTime( )>threshold) {
updateMap2(geo.lastPosition);
} else {
loc.getCurrentPosition(function(position) {
    updateMap2(position);
});
}
```

At box 428, the device location is identified via whatever methods are available. For example, the native application may initially check to see if GPS data is available, and if it is not, may submit a query to a remote server for an identification of a location based on WiFi location or Cell-ID (e.g., MY LOCATION). The native application may also translate any locational identifier so as to be usable by the application. For example, such translation may result in the native application returning a machine-usable location identifier such as a lat/long coordinate, or a human-readable location description, such as the name of a town. Such information is returned to the browser at box 430.

The browser-based application may then use the information in various manners. For example, the application may display the user's location next to a search box so that the user readily knows what location will be associated with their search query if they submit a local search request (and so that they can override the location by explicitly including allocation in their query). At box 432, the device receives a query from a user, and appends the location data to the query before sending the entire query to a remote search engine. The appending of location data may be carried out by the browser-based application or by the native application. If one of the applications provides for historical tracking of locations used with searches, an identifier for the location submitted with the query may also be saved, such as in a list of recently-used locations. If the particular location does not yet exist in the list, it can be added at the top, and if it already does exist, it can be moved to the top of the list.

The application may then receive the search results and display those results along with a user-readable location description. In this manner, the user can readily see that their results are directed at the particular location. The user may also be presented with a drop down menu or similar interface object by which the user may select a different recent location simply by pointing at the location. In this manner, the user may quickly b presented with local results for the other location, if the user did not intend to search on the location that was first identified by their device.

Figure 5A:
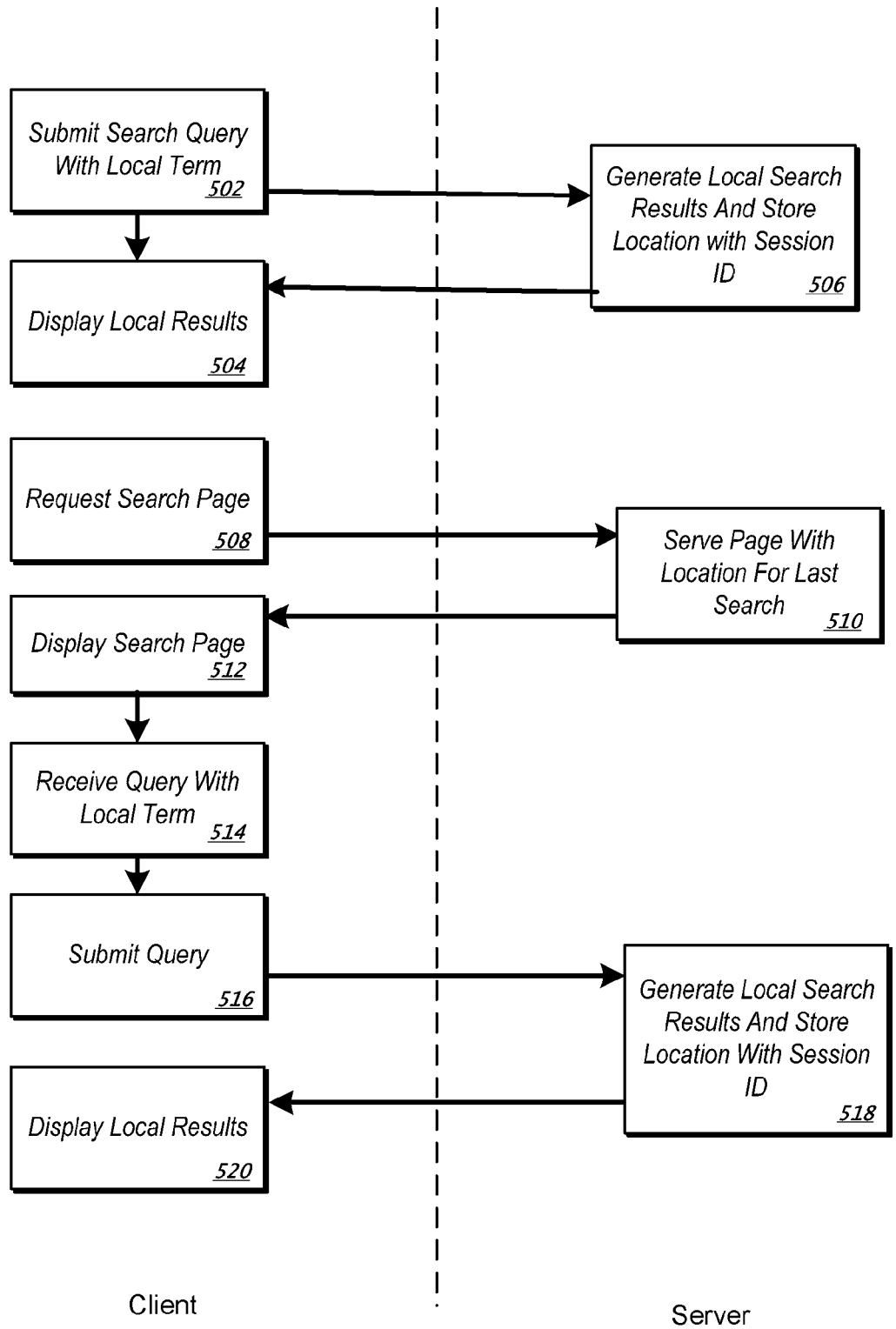
FIG. 5A is a swim lane diagram of a process for tracking locations associated with search queries.

FIG. 5A is a swim lane diagram of a process for tracking locations associated with search queries. In general, the process shows interactions between a client and server where a user is entering search queries that contain location-related terms.

The process begins at box 502, where a user enters a search query that includes a local term, and the user's client device submits the query to a search server. The local term may include, for example, the name of a city or a landmark (e.g., a stadium), such as "sushi near Soldier Field". The server then returns local results for sushi restaurants around Soldier Field in Chicago, and the client device displays the results. In the background, the server may also store or pass the location of "Chicago" to the client device, and the location may be saved in a list of recently-searched locations for the device (e.g., on the server, with a session ID, or in a cookie on the client).

At box 508, the user has left searching for awhile and is now requesting a search page again (e.g., by navigating to www.google.com). Code for the search page, which is served by the server (box 510) may make a request for a location of the device, and if an actual location cannot be determined, the device (e.g., using a native application loaded on the device for the purpose of providing location awareness to web-based application running on the device) may look to the list of recent locations and may return "Chicago" as a default search location for the device. The indication of Chicago as a recently-searched location may be provided by the server or may be stored on the client.

The search page may then be displayed on the client (box 512), but this time an indication may be shown to a user to indicate that searches will be submitted to the search engine along with the location indicator for Chicago (e.g., the application will automatically append the term Chicago to any query).

The user, however, has driven up the road to Milwaukee (and has become hungry again in doing so), and thus enters a search query of "brats in Milwaukee." If location determination is conducted at the server, the query may be submitted with the term Chicago appended to it, but the server may determine that the user provided an explicit location in the query and thus may use that explicit location (Milwaukee) over the automatically-provided location, in returning search results (box 518). In addition, the location description of "Milwaukee" may be added to the top of the historical locations list (whether stored on the client or server) and Chicago may be moved down to the second position. At box 520, the client displays the results showing restaurants in the Milwaukee area that are known for their bratwurst.

In this manner, the process provides a user with a most-recently searched location for a default location, and also provides easy access to a list of recently searched locations. In addition, the process shown here may be supplemented when actual location information, such as in the form of GPS data, is available to a device—though mechanisms may be used to determine whether a user really wants to search on their current location or would prefer to search on a location defined in or related to one of their prior queries.

Figure 5B:
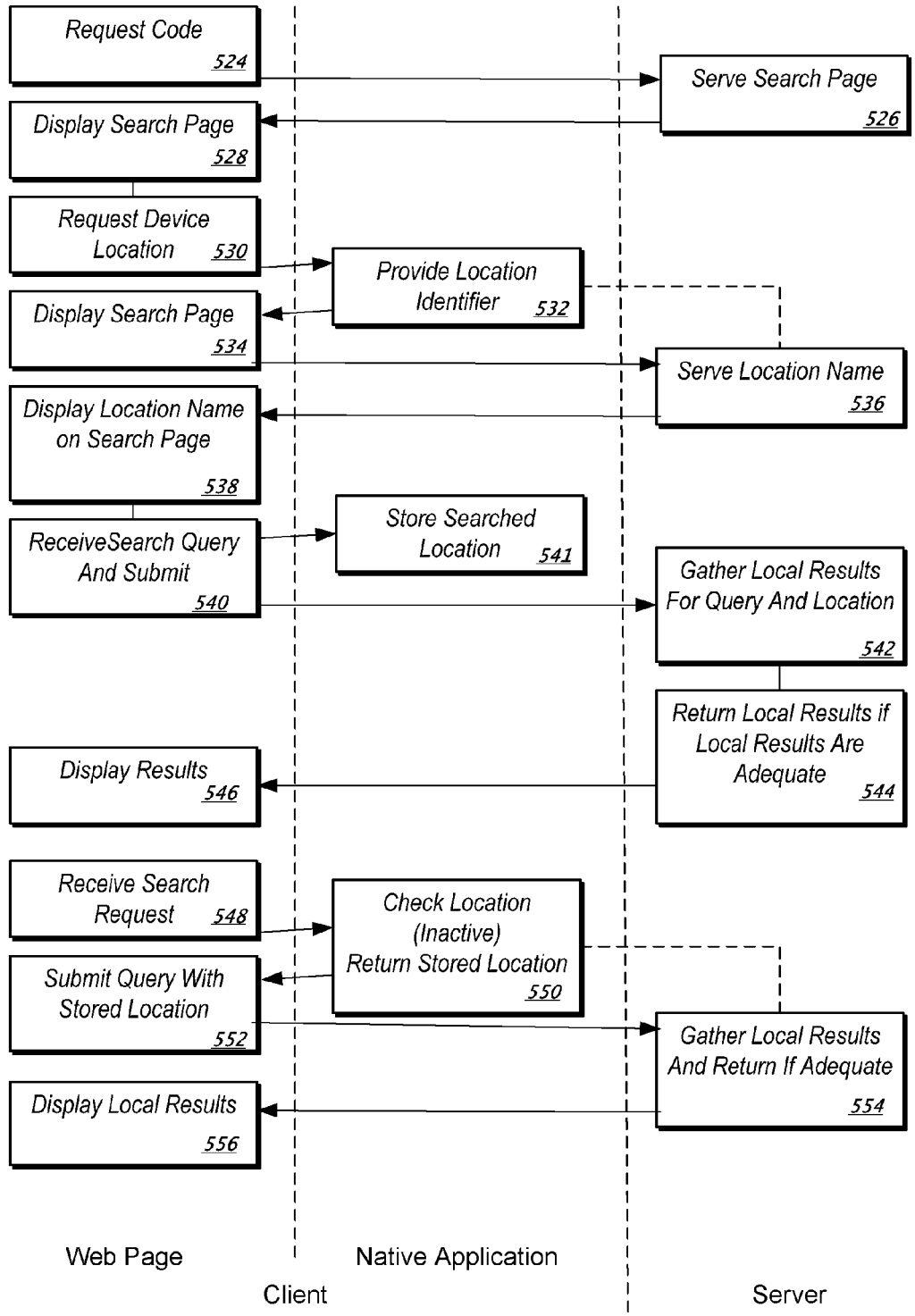
FIG. 5B is a swim lane diagram of a process for tracking locations associated with search queries, where a native application assists a berowser-based application.

FIG. 5B is a swim lane diagram of a process for tracking locations associated with search queries, where a native application assists a browser-based application. The process is similar in certain ways to the process discussed in FIG. 4B, though an example of features carried out by each of three components in the process—a web page or code running on the web page, a native application separate from a web browser, and a server—is shown to provide an clearer example of how responsibilities may be split up in certain implementations.

At box 524, a user navigates to a web page (box 524) and their browser makes a request (e.g., an HTTP request) for code to render the page. The server serves such code (box 526), which may take the form of code for a search engine home page, and the web page is rendered on a client device that the user is using (box 528). JavaScript code on the web page may then request a location of the device (box 530) and the native application may then generate a location identifier (box 532). If the identifier is not in a human-readable form (e.g., it is simply a lat/long indicator), the native application or the web page code (box 534) may submit the identifier to the server to have the identifier translated into a name of the location (box 536).

The web page may then display the name of the location, such as below a search box on a search page, so that a user will know the location that will be automatically associated with any query they submit that is local in character (box 538). At box 540, the user enters a query, and the web page submits that query. Such submission may happen directly from the page to the server, as shown, or may be performed via the native application. In addition, the process may result in an indicator (e.g., the location name) being stored as a historical search location for the device (box 541).

The server may then gather local search results that correspond to the query and the location, and may return those results if they are adequate. If the local results are inadequate (e.g., if there are too few relevant results, or the quality of the results is too low), the server may simply return general search results. The results may then be displayed on the client device (box 546).

At a later time, the user may again enter a query, or search request (box 548), and at the time the request is submitted, the native application may be unable to identify an actual location for the device, such as if the device is inside a downtown building so that GPS coverage is spotty (box 550). The native application may then fall back on the stored location for the previously-run search, and that location may be submitted to the server, either by the web page or the native application (boxes 550, 552). The server may again generate local results (box 554) in a manner like it did before, and the client may display the results (box 556). Such a process may repeat indefinitely, with a user providing queries, and locations being associated with those queries (either actual locations or locations inferred from the content of the queries themselves) and stored as previously-used locations.

Figure 6:
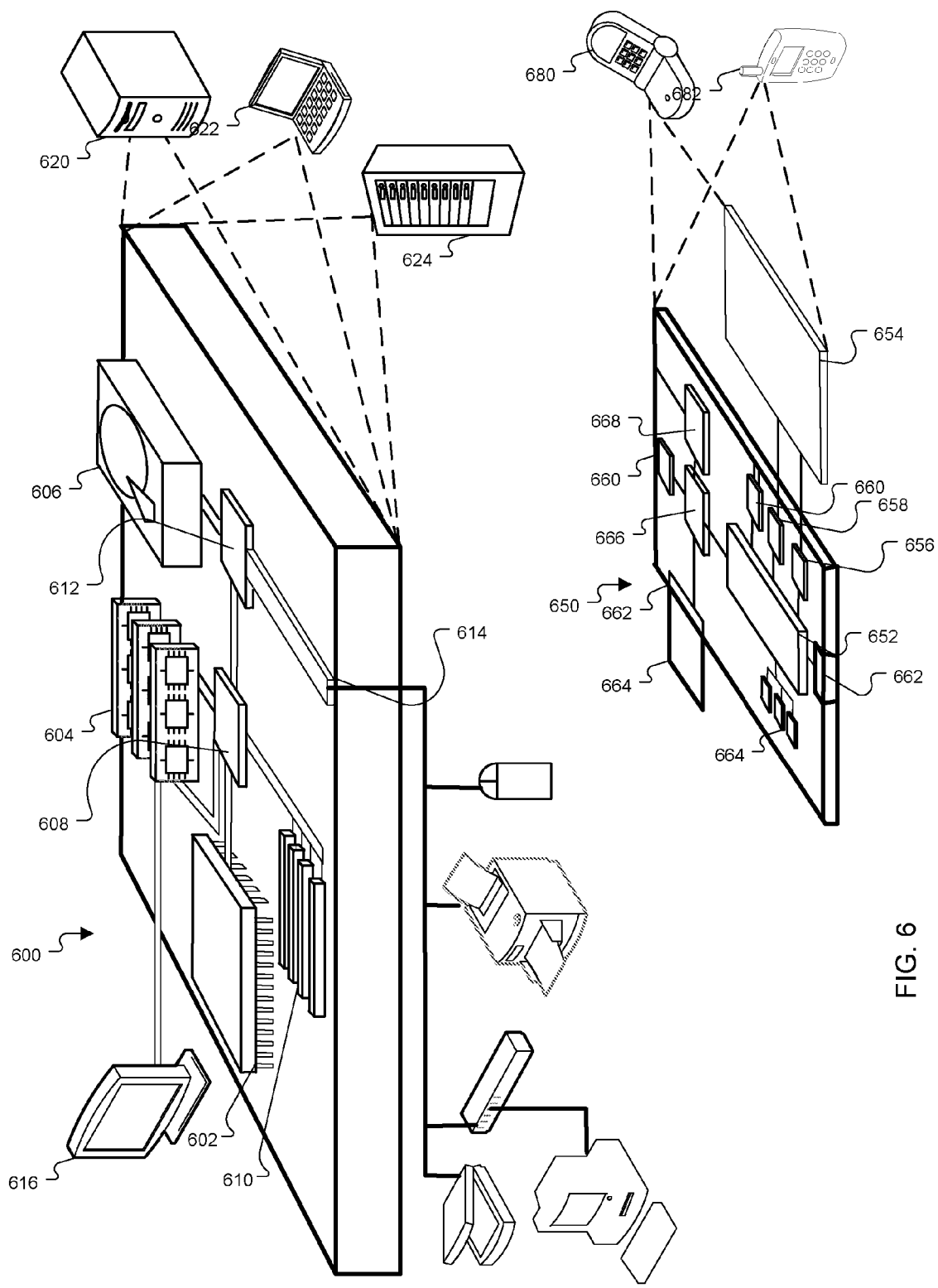
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect web-based search, but other forms of applications may access and use location information on a computing device.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by a native search application, a search query from a web browser;
   determining, by the native search application, that (i) a location-based term does not occur in the search query and (ii) no explicit location information is available to the web browser;
   in response to determining that (i) a location-based term does not occur in the search query and (ii) no explicit location information is available to the web browser, selecting, by the native search application, two or more particular geographic locations, from among multiple, previously-identified geographic locations;
   transmitting, to a search engine and by the native search application, both (i) a first search query comprising the search query appended with data identifying one of the two or more particular geographic locations, and (ii) a second search query comprising the search query appended with data identifying another of the two or more particular geographic locations;
   receiving, by the native search application, (i) first search results associated with the first search query, and (ii) second search results associated with the second search query; and
   transmitting, by the native search application, both (i) one or more of the first search results associated with the first search query, and (ii) one or more of the second search results associated with the second search query.

2. The method of claim 1, wherein the multiple previously-identified geographic locations comprise a list of recent locations.

3. The method of claim 1, wherein selecting, by the native search application, the two or more particular geographic locations includes selection of a most recent location.

4. The method of claim 1, wherein selecting, by the native search application, two or more particular geographic locations includes selecting a top n number of recent locations, wherein n is greater than 1.

5. The method of claim 1, further comprising assigning a first weight to the first search query and assigning a second weight, different from the first weight, to the second search query.

6. The method of claim 1, wherein the native search application and the web browser are both installed on a mobile computing device and the native search application transmits both (i) one or more of the first search results associated with the first search query, and (ii) one or more of the second search results associated with the second search query, to the web browser.

7. A system comprising:
   one or more computers and one or more storage devices storing instructions that are operable, when executed by the one or more computers, to cause the one or more computers to perform operations comprising:
   receiving, by a native search application, a search query from a web browser;
   determining, by the native search application, that (i) a location-based term does not occur in the search query and (ii) no explicit location information is available to the web browser;
   in response to determining that (i) a location-based term does not occur in the search query and (ii) no explicit location information is available to the web browser, selecting, by the native search application, two or more particular geographic locations, from among multiple, previously-identified geographic locations;
   transmitting, to a search engine and by the native search application, both (i) a first search query comprising the search query appended with data identifying one of the two or more particular geographic locations, and (ii) a second search query comprising the search query appended with data identifying another of the two or more particular geographic locations;
   receiving, by the native search application, (i) first search results associated with the first search query, and (ii) second search results associated with the second search query; and
   transmitting, by the native search application, both (i) one or more of the first search results associated with the first search query, and (ii) one or more of the second search results associated with the second search query.

8. The system of claim 7, wherein the multiple previously-identified geographic locations comprise a list of recent locations.

9. The system of claim 7, wherein selecting, by the native search application, the two or more particular geographic locations includes selection of a most recent location.

10. The system of claim 7, wherein selecting, by the native search application, two or more particular geographic locations includes selecting a top n number of recent locations, wherein n is greater than 1.

11. The system of claim 7, the operations further comprising assigning a first weight to the first search query and assigning a second weight, different from the first weight, to the second search query.

12. The system of claim 7, wherein the native search application and the web browser are both installed on a mobile computing device and the native search application transmits both (i) one or more of the first search results associated with the first search query, and (ii) one or more of the second search results associated with the second search query, to the web browser.

13. A non-transitory computer-readable medium storing software comprising instructions executable by one or more computers which, upon such execution, cause the one or more computers to perform operations comprising:
   receiving, by a native search application, a search query from a web browser;
   determining, by the native search application, that (i) a location-based term does not occur in the search query and (ii) no explicit location information is available to the web browser;
   in response to determining that (i) a location-based term does not occur in the search query and (ii) no explicit location information is available to the web browser, selecting, by the native search application, two or more particular geographic locations, from among multiple, previously-identified geographic locations;
   transmitting, to a search engine and by the native search application, both (i) a first search query comprising the search query appended with data identifying one of the two or more particular geographic locations, and (ii) a second search query comprising the search query appended with data identifying another of the two or more particular geographic locations;
   receiving, by the native search application, (i) first search results associated with the first search query, and (ii) second search results associated with the second search query; and
   transmitting, by the native search application, both (i) one or more of the first search results associated with the first search query, and (ii) one or more of the second search results associated with the second search query.

14. The medium of claim 13, wherein the multiple previously-identified geographic locations comprise a list of recent locations.

15. The medium of claim 13, wherein selecting, by the native search application, the two or more particular geographic locations includes selection of a most recent location.

16. The medium of claim 13, wherein selecting, by the native search application, two or more particular geographic locations includes selecting a top n number of recent locations, wherein n is greater than 1.

17. The medium of claim 13, the operations further comprising assigning a first weight to the first search query and assigning a second weight, different from the first weight, to the second search query.

18. The medium of claim 13, wherein the native search application and the web browser are both installed on a mobile computing device and the native search application transmits both (i) one or more of the first search results associated with the first search query, and (ii) one or more of the second search results associated with the second search query, to the web browser.

19. The method of claim 1, comprising:
   determining that the search query includes a term that indicates that the search query is for a search across a geographic area,
   wherein selecting, by the native search application, two or more particular geographic locations, from among multiple, previously-identified geographic locations, is further in response to determining that the search query includes the term that indicates that the search query is for search across a geographic area.

20. The method of claim 1, wherein determining, by the native search application, that no explicit location information is indicated as available to the web browser, comprises:
   determining, by the native search application, that the search query does not include location information based at least on global positioning satellite data.

* * * * *